United States Patent Office 3,733,278
Patented May 15, 1973

3,733,278
DETERGENT SLURRY PROCESS
Eric W. Vessey, Springfield, Pa., assignor to Philadelphia Quartz Company, Philadelphia, Pa.
No Drawing. Filed Mar. 22, 1971, Ser. No. 127,057
Int. Cl. C11d 3/065, 11/00, 11/02
U.S. Cl. 252—135                         4 Claims

ABSTRACT OF THE DISCLOSURE

A method has been found for increasing the alkali metal silicate content of spray dried detergents without decreasing the spray dryer production and without changing the solubility characteristics of the detergent. The method involves the preparation of detergent slurries in a crutcher with high alkali metal silicate content by adding alkali metal silicate glass to the slurries in such a manner that it readily dissolves. The glass is added through a jet nozzle with steam pressure. Thus, the amount of water that must be removed by spray drying can be reduced or remain unchanged while the silicate solids of the slurry and subsequently the detergent can be increased substantially.

INTRODUCTION

Spray dried detergents are usually prepared by combining the ingredients in a slurry of about 60% solids in a blending device called a crutcher, followed by spray drying of the slurry to obtain a granular, free-flowing product of about 10% water content. A home laundry detergent typically includes 5 to 40% surfactant or combination of surfactants; 10 to 55% seqeustering agent, such as sodium tripolyphosphate (STPP) or an organic sequestering agent; 2 to 10% sodium silicate; 0 to 5% antiredeposition agent, such as sodium carboxymethylcellulose (Na CMC); 0 to 25% sodium sulfate and 0 to 2% optical brightener. Other ingredients such as perfumes, dyes, enzymes, speckles, etc. are present in small amounts and are added after spray drying.

In general, such a spray dried detergent may be prepared by the following process. The surfactant, which generally is a linear alkyl benzene sulfonate, is produced by sulfonating the alkylate group with sulfuric acid and then neutralizing it with 50% caustic. The result is a paste of 50% solids containing the surfactant and sodium sulfate. The paste is placed in the crutcher and the other ingredients are added and blended to form a slurry of 60 to 70% solids which is then spray dried.

Generally, the sodium silicates, which are included in detergents for their detergent building, corrosion inhibiting and bead forming properties, are added to the crutcher mix as solutions containing 40 to 60% water. Most of this water, along with the water added with the surfactant paste, must be removed in the drying tower to give a free-flowing, granular product.

The production or throughput of any spray tower is dependent on the size of the tower; or the conditions of operation, which are often fixed; and on the amount of water that must be removed from the slurry to give an apparently dry product. Therefore, since the amount of water added with the surfactant paste is fixed, the amount of alkali metal silicate necessary for the best alkalinity, buffering, deflocculation and corrosion prevention, cannot be added as solutions without reducing the production of the spray tower. Also the silicate solids necessary to partially or completely replace phosphates in detergents cannot be added as solutions without reducing the production. However, if the amount of water added with the alkali metal silicate can be reduced, the alkali metal silicate content of the slurry can be increased without a decrease in detergent production.

I have found that slurries can be produced at high alkali metal silicate content but at the same or higher total solids contents than are produced when low levels of silicate solutions are used. Such slurries which yield completely satisfactory spray dried detergents are prepared by using an alkali metal silicate glass as the source of silica. It has been thought that such glasses dissolve too slowly for use in spray dried detergents. Surprisingly, I have found that alkali metal silicate glasses, when added to crutcher slurries by forcing the finely divided particles through a jet nozzle with steam pressure, dissolve rapidly enough for processing and contribute to the solubility of the final detergent mixture as well as contributing excellent builder, corrosion resistant, and bead forming properties.

THE INVENTION

The finely divided alkali metal silicate glass can be produced by any method such as fusion of an alkali metal carbonate with a source of silica; the $SiO_2/M_2O$ mole ratio can be 1.2/1.0 to 4.0/1.0 where M stands for an alkali metal or metals. In general, glasses with a mole ratio of 2.5 or less are the most useful. However, the particle size is also very important. The particle size of the glass should be less than about 100 mesh and preferably less than 200 mesh. Silicate glasses that have been ground in ball mills and the like are useful but it has been found that other methods of sub-dividing glasses also produce more suitable materials for this invention.

The detergent slurries of this invention can be prepared in the crutcher by blending 10 to 85 pbw. of surfactant paste, which may consist of 28% linear dodecylbenzene sulfonate, 22% $Na_2SO_4$ and 50% $H_2O$; 10 to 60 pbw. of sequestering agent, such as STPP or organic sequestering agents; 0 to 5 pbw. of anti-redeposition agent such as Na CMC and 0 to 2% optical brightener. Then 5 to 30 pbw. of alkali metal silicate glass particles are jet atomized i.e. dispersed into the crutcher with steam pressure. The jet atomization provides good dispersion of the glass particles throughout the slurry for even and quick dissolving, partially hydrates the glass for faster dissolving and raises the temperature of the slurry to facilitate the dissolving still more. Ingredients such as soda ash, borax and the like, generally classified as bulking agents, can also be included. The slurry would probably be at 55 to 70° C. before addition of the glass particles and steam. During the addition of the glass with the steam the temperature can rise as high as 95° C. In general, the addition of the glass and steam is gradual and takes place during the few minutes that the slurry is usually held in the crutcher during blending. The slurry is then pumped into the spray tower and dried with hot air to give a free-flowing granular product containing 3 to 15% water. The detergents prepared in this manner dissolved almost completely in washing solutions and were efficient laundry compounds.

I have found that detergent slurries that are high in alkali metal silicate solids can be formed in a crutcher easily by this method of adding silicate glass through a jet nozzle with steam pressure. The rapid dissolution of the glass particles probably results from the good dispersion of the glass throughout the detergent slurry, the partial hydration of the glass by the steam, the rise in temperature and consequent decrease in viscosity of the detergent slurry, and the secondary mixing action caused by steam in the slurry. These slurries are then spray dried to completely satisfactory products.

EXAMPLES

A further understanding of the invention can be obtained from the following illustrative examples that should not be considered restrictive. Examples No. 1 and 2 are carried out according to present practice and do not represent the present invention.

EXAMPLE 1

A slurry of the following composition was made in a crutcher using a sodium silicate solution.

| | Pbw. |
|---|---|
| Surfactant paste (28% linear dodecylbenzene sulfonate, 22% $Na_2SO_4$ and 50% $H_2O$) | 64.0 |
| STPP | 50.0 |
| Sodium silicate solution (2.4 $SiO_2/Na_2O$, 50% solids) | 12.0 |
| Na CMC | 1.5 |
| Blancophor RG (optical brightener, GAF Corp.) | 0.3 |

This slurry contained 40 pbw. of water, of this 30 pbw. must be removed to produce a product of about 10% water content. The slurry was at 75° C. at the start of blending and 65° C. after 10 minutes when the slurry was pumped into a spray tower with full counter-current air flow and jet type spray. The inlet temperature was 320° C. and the outlet temperature was 93° C. The slurry entered the spray tower at the rate of 6500 pbw./hour and the production rate was 500 pbw./hour of a free-flowing, granular product with a density of 0.34 g./cc., moisture content of 10.1% and a silicate solids content of 6.0%. The product was an efficient laundry compound which dissolved almost completely in household washing machines under normal use conditions.

EXAMPLE 2

A slurry of the following composition was made in a crutcher using a sodium silicate solution (mole ratio 2.4 $SiO_2/Na_2O$, solids content 50%) and anhydrous sodium nitrilotriacetic acid (SNTA).

| | Pbw. |
|---|---|
| Surfactant paste (28% linear dodecylbenzene sulfonate, 22% $Na_2SO_4$ and 50% water) | 62.0 |
| STPP | 38.0 |
| SNTA | 10.0 |
| Sodium silicate solution (2.4 $SiO_2/Na_2O$, 50% solids) | 18.0 |
| Na CMC | 1.5 |
| Blancophor RG (optical brightener, GAF Corp.) | 0.3 |

This slurry contained 40 pbw. of water, of this 30 pbw. must be removed to produce a product of about 10% water content. The temperature of the slurry was 75° C. at the start of blending and 65° C. after 10 minutes when the slurry was pumped into the spray tower of Example 1. The slurry entered the spray tower at 6,400 pbw./hour and the production rate was 5,050 pbw./hour of a free-flowing, granular product with a density of 0.35 g./cc., a moisture content of 10.3% and a silicate solids content of 9.0%. The product was an efficient laundry compound which dissolved almost completely in household washing machines.

EXAMPLE 3

A slury of the following composition was made in a crutcher.

| | Pbw. |
|---|---|
| Surfactant paste (28% linear dodecylbenezne sulfonate, 22% $Na_2SO_4$ and 50% $H_2O$) | 62.0 |
| STPP | 38.0 |
| SNTA | 10.0 |
| Na CMC | 1.5 |
| Blancophor RG | 0.3 |

As this slurry was being blended 9.0 pbw. of sodium silicate glass (2.4 $SiO_2/Na_2O$, <200 mesh) was jet mixed into the crutcher with 1.2 pbw. of water as steam. The temperature was 75° C. as the addition of glass and steam was started, after the addition of the glass was complete the temperature was 80° C. The slurry contained about 32 pbw. of water, of this about 22 pbw. must be removed to produce a product of about 10% water. The slurry was pumped to the spray tower of Example 1 at a rate of 8,300 pbw./hour so that the production rate was 6,800 pbw./hour of a free flowing, granular product with a density of 0.34 g./cc., a moisture content of 9.8% and a silicate solids content of 9.0%. The product was an efficient laundry compound which dissolved almost completely in household washing machines.

EXAMPLE 4

A slurry of the following composition was made in a crutcher.

| | Pbw. |
|---|---|
| Surfactant paste (28% linear dodecylbenzene sulfonate, 22% $Na_2SO_4$ and 50% $H_2O$) | 62.0 |
| STPP | 20.0 |
| Sodium glucoheptonate | 20.0 |
| Na CMC | 1.5 |
| Blancophor RG | 0.3 |

As this slurry was being blended 20.0 pbw. of sodium silicate glass (2.0 $SiO_2/Na_2O$, <200 mesh) was jet dispersed into the crutcher with 5 pbw. of water as steam. The temperature was 75° C. as the addition of glass and steam was begun, after the addition of the glass was complete the temperature was 87° C. This slurry contained 36 pbw. of water, of this about 26 pbw. must be removed to produce a product of about 10% moisture content. This slurry was pumped to the spray tower of Example 1 at a rate of 7,300 pbw./hour so that the production rate was 5,800 pbw./hour of a free-flowing granular product with a density of 0.37 g./cc., a moisture content of 9.7% and a silicate solids content of 20.1%. The product was an efficient laundry compound which dissolved completely in household washing machines.

EXAMPLE 5

A slurry of the following composition was made in a crutcher.

| | Pbw. |
|---|---|
| Surfactant paste (28% linear dodecylbenzene sulfonate, 22% $Na_2SO_4$ and 50% $H_2O$) | 62.0 |
| Sodium boroglucoheptonate | 33.0 |
| Na CMC | 1.5 |
| Blancophor RG | 0.3 |

As this slurry was being blended 30.0 pbw. of a sodium silicate glass (2.0 $SiO_2/Na_2O$, <200 mesh) was jet dispersed into the crutcher with 7 pbw. of water at steam. The temperature was 75° C. as the addition of glass and steam was started, after the addition of the glass was complete the temperature was 91° C. This slurry contained 38 pbw. of water, of this 28 pbw. must be removed to produce a product of about 10% moisture content. This was pumped to the spray tower at a rate of 6,850 pbw./hour so that the production rate was 5,300 pbw/hour of a free-flowing, granular product with a density of 0.38 g./cc., a moisture content of 9.9% and a silicate solids content of 30.1%. The product was an efficient laundry compound which dissolved completely in household washing machines.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the compositon unsuitable for the disclosed purposes. Therefore, this application for Letters Patent is intended to cover all such modifications, changes and substitutions as would reasonably fall within the scope of the appended claims.

What I claim is:

1. In the preparation of a free flowing spray dried detergent having about 3 to 15% water therein from a slurry consisting essentially of 30 to 40% water, 5 to 40% surfactant, 10 to 55% sequestering agent, 0 to 5% anti-redepositon agent, 0 to 25% sodium sulfate, 0 to 2% optical brightener and 5 to 35% alkali metal silicate, the improvement in the preparation of said slurry whereby said alkali metal silicate selected from the group consisting of sodium silicate, potassium silicate and sodium-potassium double silicates and having a mole ratio of $SiO_2/M_2O$ of 1.2 to 4.0/1.0 in the form of fine glass particles having a particle size of less than 100 mesh; is subjected to jet atomization with steam prior to its introduction to said slurry said steam/silicate weight ratio being 1.0/4 to 7.5 thereby improving said slurry by: having a partially hydrated silicate introduced thereto which is readily soluble, raising the temperature of said slurry, increasing the silicate content of said slurry without increasing the percent of water present and dispersing said silicate more evenly throughout said slurry.

2. The process of claim 1 wherein the alkali metal silicate glass has a mole ratio of 1.2 to 2.5/1.0 of $SiO_2/M_2O$.

3. The process of claim 1 wherein between 9 and 30 pbw. of silicate glass are introduced into the slurry after jet atomization with steam.

4. The process of claim 3 wherein the particle size of the silicate glass is less than 200 mesh.

References Cited

UNITED STATES PATENTS

| | | | |
|---|---|---|---|
| 3,247,122 | 4/1966 | Schaafsma et al. | 252—135 |
| 3,242,091 | 3/1966 | Monick | 252—109 |
| 3,133,024 | 5/1964 | Feierstein et al. | 252—539 |
| 3,090,679 | 5/1963 | Tauch | 23—110 A |
| 2,783,129 | 2/1957 | Baral | 23—110 A |
| 1,119,720 | 12/1914 | Paterson | 23—110 A |

OTHER REFERENCES

"Soluble Silicates in Powder Forms," Bulletin 17-2, published by Philadelphia Quartz Co., 1969, 7 pages.

"PQ Soluble Silicates for Detergent Formulations," published by Philadelphia Quartz Co., 1967, pp. 2 and 9.

LEON D. ROSDOL, Primary Examiner

D. L. ALBRECHT, Assistant Examiner

U.S. Cl. X.R.

252—527, 539